Dec. 29, 1936.  A. D. WHIPPLE ET AL  2,065,636
APPARATUS FOR TREATING OR IMPREGNATING PAPER
Filed March 4, 1931   3 Sheets-Sheet 1

Allen D. Whipple and
Cortland W. Davis
INVENTORS,

BY
Thomas G. Steward,
ATTORNEY.

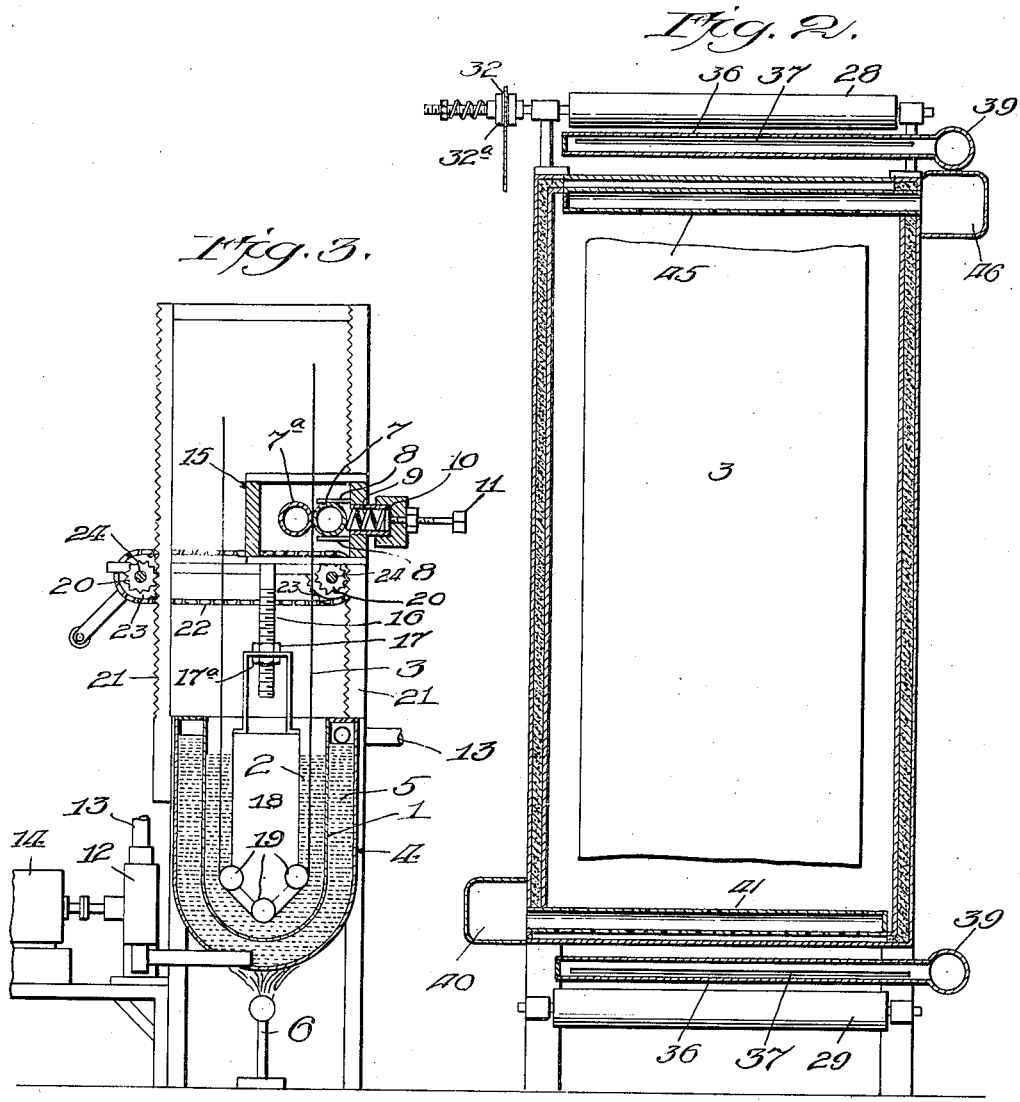

Dec. 29, 1936.  A. D. WHIPPLE ET AL  2,065,636
APPARATUS FOR TREATING OR IMPREGNATING PAPER
Filed March 4, 1931  3 Sheets-Sheet 3
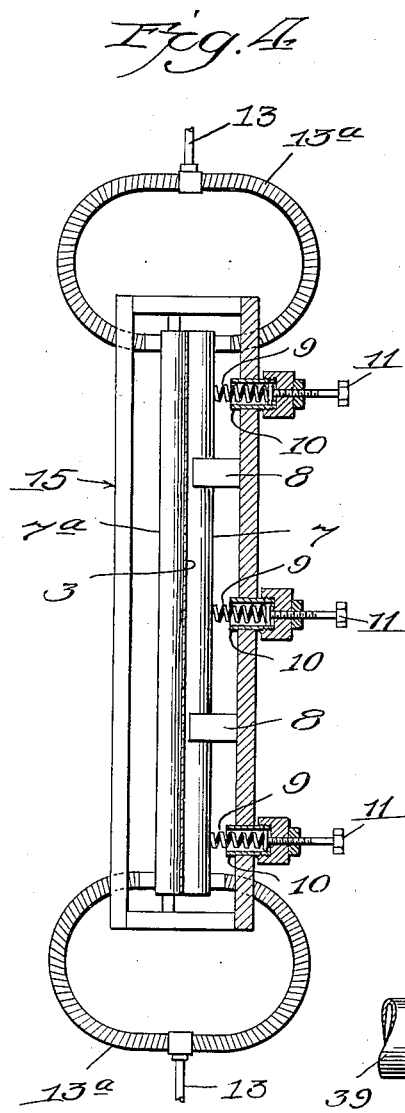
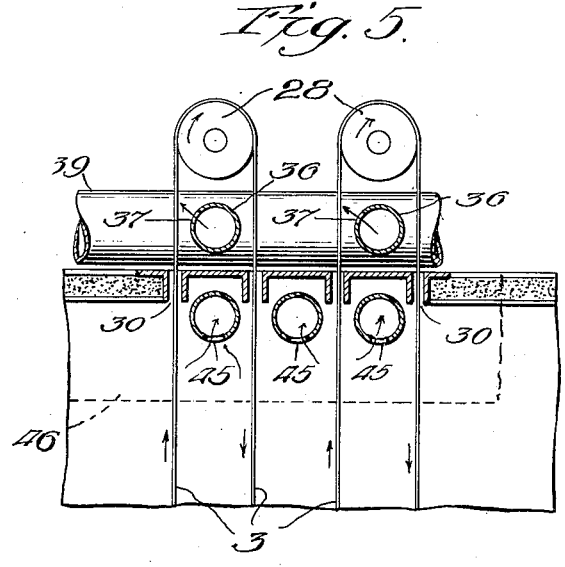
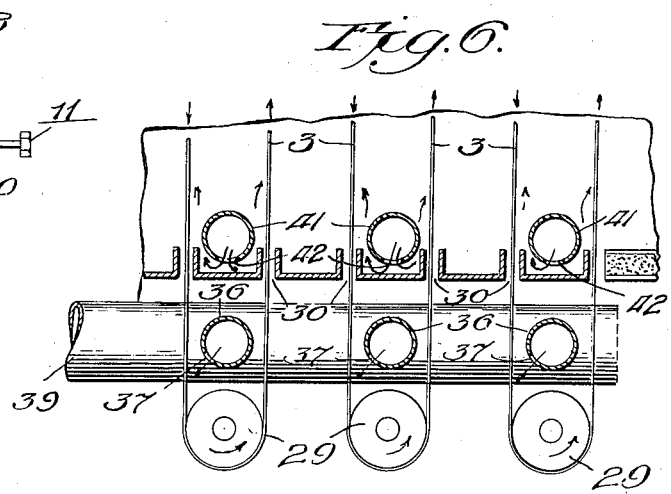

Patented Dec. 29, 1936

2,065,636

UNITED STATES PATENT OFFICE 2,065,636

APPARATUS FOR TREATING OR IMPREGNATING PAPER

Allen D. Whipple and Cortland W. Davis, Alexandria, Ind., assignors to The Mantle Lamp Company of America, Chicago, Ill., a corporation of Illinois Application March 4, 1931, Serial No. 520,118

22 Claims. (Cl. 91—55)

The invention relates to devices for so treating or impregnating paper or other absorptive substance, that the finished product will be cured or polymerized; and said invention, broadly considered, involves means for heating and rendering fluent the impregnating substance, as well as means for curing or polymerizing the impregnating substance after it has entered the pores of the absorptive substance.

The invention, specifically considered, includes a suitably-heated container for melting the impregnating substance, devices associated with said container for moving a sheet of the absorptive substance into and out of said container, doffers between which the impregnated sheet may pass in order to remove excess coatings from both sides thereof, and an oven in which the remaining and absorbed impregnating substance may be completely cured or polymerized.

The impregnating substance may be the molten polymerizable material described in the pending application of Fred O. Reiss, Serial Number 518,907, filed February 27, 1931, or any other unpolymerized or incompletely polymerized fusible material which may have a high boiling point and may be rendered stable by heat treatment.

The invention will best be understood if reference be had to the accompanying drawings constituting parts of this specification, in which—

Figure 2 is a vertical sectional view taken on the line 2—2 of Figure 1.

Figure 3 is an enlarged vertical sectional view of a part of the device shown in Figure 1, and Figures 4, 5 and 6 are views showing details of the mechanism.

Figure 1:
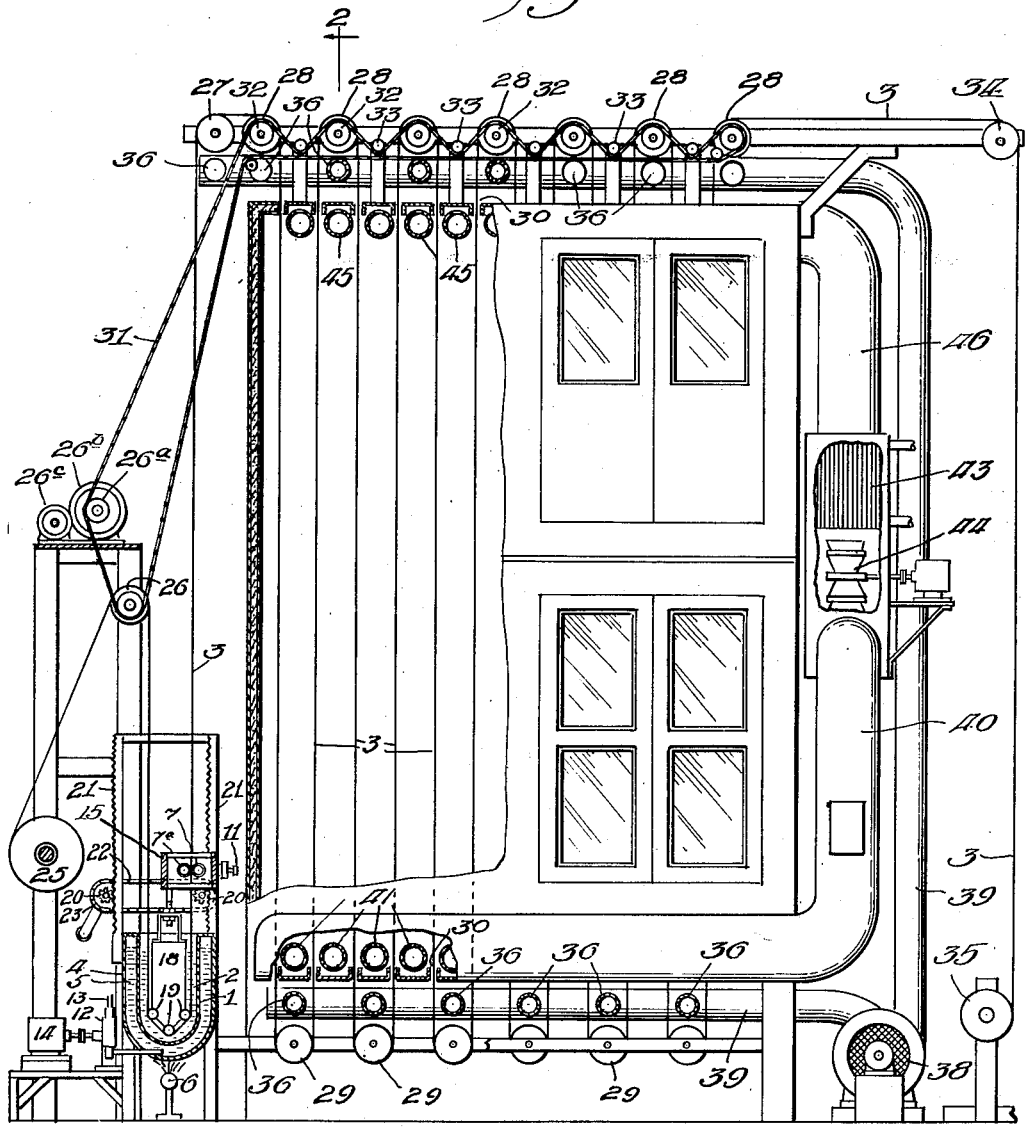
Figure 1 is a view of the device in side elevation, parts thereof being broken away.

1 is an open U-shaped container for the heated and fluent substance 2, through which an absorbent sheet 3 of suitable material is to be passed, and 4 is a tank of similar shape in which is disposed a liquid 5 having a high boiling point. A burner 6 supplies heat to this tank.

Situated directly above that side of the container 1 from which the sheet 3 emerges, are hollow doffers 7, 7a, having closed ends, the doffer 7a being stationary, as shown, and the doffer 7 being adjustably disposed between guides 8, 8, and actuated by springs 9 that are each enclosed in a guide tube 10. These springs are compressed by screws 11, whereby desired degrees of pressure may be exerted against various parts of said doffer 7 in order to so remove excess coatings from the faces of said sheet 3 that the sheet will be uniformly impregnated throughout.

These hollow doffers 7, 7a are parts of a circuit in which a pump 12, tubes 13, branch tubes 13a and the tank 4 are included. The pump is driven by a motor 14. The heated and fluent liquid which flows through the circuit, maintains said hollow doffers at practically the same temperature as that of the liquid mass 2 in the container 1, thus enabling said doffers readily to remove the excess coatings and thus prepare the impregnated sheet for further and final treatment.

The doffers 7, 7a are enclosed by a vertically-adjustable and suitably guided cage 15 which also carries the guides 8 for the adjustable doffer 7 and its adjusting spring 9 and screws 11.

Depending from the cage 15 is a screw 16 having thereon nuts 17, 17a for adjustably supporting a guide 18, having at its lower end spacers 19 over which the sheet 3 will pass as it moves through the container 1.

The doffers 7, 7a and the guide 18, as well as their associated elements, may be raised or lowered by pinions 20 which engage guide-racks 21 that are attached to said cage 15 and are compelled to move in unison by a chain 22 that passes over sprockets 23 carried by the shafts 24 of said pinions 20, the object of adjusting these doffers being to establish such a distance between the surface of the liquid substance 2 in the container 1 and said doffers, that the surface coatings of the sheet 3 may have time to enter, and fill the pores of the absorptive body of said sheet 3 from which the air has been expelled by the heat of the liquid 2. Said guide 18 reduces the volumetric capacity of the container 1, thus requiring frequent renewals of the charge to thereby avoid such alterations thereof as would be produced in said charge if the heating thereof were unduly prolonged.

A web of the material to be treated is initially carried by a drum 25 from which it passes over a driven pulley 26 and thence downward into the container 1 wherein it becomes saturated and coated with the fluent impregnating substance 2, the spacers 19 carried by the guide 18 then holding the web 3 out of contact with said guide in order that said impregnating substance 2 may readily reach both faces thereof.

After leaving said container 1, said web passes between the doffers 7, 7a, over an idler 27, and thence alternately over upper driven polished guide rolls 28 and lower polished idler rolls 29 which, respectively, are disposed above the top and below the bottom of the heat-insulated oven in which the curing or polymerization is effected, the top and the bottom wall of said oven being provided with slits 30 through which said web may pass. An endless chain 31 engaging sprockets 32 on ends of the upper rolls 28 and laid underneath idlers 33 which alternate with said rolls, drives and synchronizes the speeds of these rolls, while friction clutches 32a equalize strains in the web.

This chain 31 also drives the pulley 26 over which the web 3 runs as it leaves the drum 25. This chain is driven by a sprocket.

After leaving the last of the series of synchronized rolls 28, the web passes over an idler 34 and thence downward to a drum 35 on which it is automatically wound.

Above and below the oven, and proximate the rolls 28 and 29, are disposed cold air pipes 36, each having lateral slots 37, so that air emitted by said slots will cool the still uncured impregnated material and temporarily relieve it of the stickiness which it then possesses so that the web will not adhere to the rolls 28, 29, as it passes over them. A blower 38 supplies cold air through pipes 39 to said air pipes 36.

The oven is heated by air supplied by a conduit 40 from which lead distributing pipes 41 having perforations 42 that direct hot air against the webs to thereby reheat them, and then enable the temporarily suspended curing or polymerizing process to continue, the air being heated by a radiator 43 and driven downward through the conduit 40 and into the distributing pipes 41, by a blower 44. The air emitted by said perforations 42 flows upward in contact with the several and vertically-disposed portions of the web 3, and thence outward through suction pipes 45 which communicate with an exhaust pipe 46 leading to said radiator 43 and said blower 44, thus completing a circuit through the oven.

Having thus described our invention, what we claim is:

1. A machine for impregnating and treating sheet material, including means for impregnating a sheet of material with desired polymerizable fluent substance, an oven through which the impregnated sheet may pass, rolls for guiding said sheet as it passes through said oven, and air-supplying means disposed adjacent each roll for cooling said sheet to thereby relieve the uncured substance of its stickiness and prevent it from adhering to said rolls.

2. A machine for impregnating and treating sheet material, including means for impregnating a sheet of material with a desired polymerizable fluent substance, an oven through which the impregnated sheet may pass, rolls disposed outside of said oven for guiding said sheet as it passes through said oven, air-supplying means disposed adjacent each roll for cooling said sheet to thereby prevent it from adhering to said rolls, and means for supplying hot air to reheat said sheet as it leaves each of the guiding rolls to enable the temporarily suspended polymerizing process to continue.

3. A machine for impregnating and treating absorptive material, including means for impregnating a sheet of said material with a molten substance, an oven having a plurality of slits in its top and its bottom through which said sheet may pass, guide rolls for said sheet disposed adjacent said slits and above and below said oven, and cold-air pipes situated proximate said guide rolls for cooling successive portions of said sheet prior to their contact with said guide rolls.

4. A machine for impregnating and treating absorptive material, including means for impregnating a sheet of said material with a molten substance, an oven having a plurality of slits in its top and its bottom through which said sheet may pass, guide rolls for said sheet disposed adjacent said slits and above and below said oven, cold-air pipes situated proximate said guide rolls for cooling successive portions of said sheet prior to their contact with said guide rolls, and hot-air pipes disposed within said oven and between said slits.

5. A machine for treating rolled sheet material, including a container for the substance with which said material is to be treated and means for feeding the material through said container, hollow doffers between which said material passes after leaving said container, a jacket surrounding said container, series connections between said jacket and said doffers, a fluid heat-carrying medium disposed within said jacket, said doffers and said connections, and means for heating and for circulating said medium, whereby said doffers are maintained at substantially the same temperature as said substance.

6. A machine for treating rolled sheet material, including a container for a fluid substance with which said material is to be treated, means for feeding said material through said container, heated doffers for removing any excess of said substance, and means for adjusting the distance lengthwise of said material from the surface of said substance to said doffers, without altering the length of said material immersed in said substance, so that said doffers will remove a desired amount of said excess.

7. A machine for treating rolled sheet material, including a container for a fluid substance with which said material is to be treated, means for feeding said material through said container, heated doffers for removing any excess of said substance, means for adjusting the distance lengthwise of said material from the surface of said substance to said doffers, and independent means for adjusting the length of said material which is immersed in said substance.

8. A machine for treating sheet material, including a container for a fluid substance with which said material is to be treated, means for feeding said material through said container, means for heating said substance whereby said material is also heated during its travel through said substance, means for adjusting the length of said material immersed in said substance, heated doffers for removing the excess of said substance from said material, and means for independently adjusting the position of said doffers relatively to the length of travel of the sheet material from the surface of the substance in the container to the doffers.

9. A machine for treating sheet material, including a container for a fluid substance with which said material is to be treated, means for feeding said material through said container, means for heating said substance whereby said material is also heated during its travel through said substance, means for adjusting the length of said material immersed in said substance, heated doffers for removing the excess of said substance from said material, plural springs disposed along the length of one of said doffers for urging said doffers into contact with said material, and means for independently adjusting the effort of each of said springs.

10. A machine for treating sheet material, including a container for a fluid substance with which said material is to be treated, means for feeding said material through said container and doffers for removing the excess of said substance from said sheet material, plural springs disposed along the length of one of said doffers for urging said doffers into contact with said material, and means for independent adjustment of the effort of each of said springs.

11. A machine for treating sheet material, including an oven through which said material is repeatedly passed, plural rollers above and below said oven for guiding said material as it passes through said oven, and means for chilling said material just before it passes over each of said rollers, to prevent said material from adhering to said rollers.

12. A machine for treating sheet material, including a container for the substance with which the material is to be treated, doffers for removing excess quantities of said substance, plural means including springs and screws disposed along one of said doffers for adjusting said doffers to desired mutual relationship.

13. A machine for processing sheet material, including a container for the processing substance, a jacket surrounding said container, hollow doffers, going and returning connections from said jacket to said doffers, a fluid heat-carrying medium in said jacket, said doffers and said connections, and means for circulating said heat carrying medium whereby said doffers are maintained at substantially the same temperature as said substance.

14. An oven for processing a polymerizable impregnate in a sheet material, arranged to repeatedly pass said material through a heated chamber and including motion reversing rolls external of said chamber and means for directing cooling streams of air at said material at points just prior to its passage over each of said rolls to overcome the tendency of said material to adhere to said rolls.

15. A machine for impregnating and treating an absorptive sheet material, including a heated container for melting an impregnating substance, means for applying said molten substance to said material, heated means for removing the excess of said substance from said material, independent means for adjusting the distance lengthwise of said sheet material from the surface of said molten substance in said container to said heated removing means, heated means for rendering insoluble the substance which has permeated said material, and means for feeding said material through said machine.

16. A machine for impregnating and treating an absorptive sheet material, including a heated container for melting an impregnating substance, means for coating said material with the molten substance, means for removing the excess of said substance from said material, independently adjustable means for varying the distance between the surface of the molten substance in said container and the means for removing the excess substance, and means for feeding said material through said machine.

17. A machine for treating sheet material, including a container for the substance with which said material is to be treated, means for feeding the material through the container, said container having a relatively large volumetric capacity, and said means including a displacement element, whereby the volume of substance required is materially decreased while maintaining full accessibility to said container, and means for feeding said material through the machine at a predetermined rate.

18. A machine for treating sheet material with a fluent substance, including a container for said substance, a device for guiding said material into and out of said container, said device including means for materially decreasing the volume of substance required in said container, and means for feeding said material through said machine at a predetermined rate.

19. A machine for treating sheet material with a fluent substance, including a container for said substance, a device for guiding said material into and out of said container, said device including adjustable means for establishing a desired relation between the length of travel of said material through said substance and the quantity of substance in said container, and means for feeding said material through said machine at a predetermined rate.

20. A machine for impregnating sheet material including a heated container for an impregnating substance, means for feeding said material through said machine, adjustable means for controlling the length of travel of the sheet material through the impregnating substance, and doffers independently adjustable relative to the travel of the paper and the said adjustable means.

21. A machine for impregnating sheet material, including a container for maintaining an impregnating substance in fluent condition, means for feeding said sheet material through said container to heat said sheet material to drive out air and moisture and to coat said sheet material with said substance, and doffers for removing surplus impregnating substance from said sheet material, said doffers being so disposed as to allow sufficient time to permit the air surrounding said coated sheet to force the required amount of impregnating substance into the sheet to provide the desired degree of impregnation before the surplus coating is removed from said sheet by the doffers.

22. A machine for impregnating sheet material, including means for heating a meltable substance to render it fluent, means for heating said sheet material to drive out air and moisture and for coating both sides of said material with said substance, heated means for removing surplus substance from the surfaces of the paper, means for passing said sheet material through said machine at a predetermined rate, and independently-adjustable means for controlling the time that the fluent excess coatings remain upon the paper before being removed by said heated means.

ALLEN D. WHIPPLE.
CORTLAND W. DAVIS.